Nov. 3, 1970   D. A. CLAYCOMB   3,537,701
SPRING LOADED JACK LOCK ASSEMBLY
Filed Aug. 21, 1967   2 Sheets-Sheet 2

INVENTOR.
DEAN A. CLAYCOMB
BY
Whittemore, Hulbert
& Belknap
ATTORNEYS

Nov. 3, 1970 D. A. CLAYCOMB 3,537,701

SPRING LOADED JACK LOCK ASSEMBLY

Filed Aug. 21, 1967 2 Sheets-Sheet 1

INVENTOR.
DEAN A. CLAYCOMB
BY
Littlemore, Hulbert
& Belknap
ATTORNEYS

United States Patent Office 3,537,701
Patented Nov. 3, 1970

3,537,701
SPRING LOADED JACK LOCK ASSEMBLY
Dean A. Claycomb, 7059 Colony Drive,
Walled Lake, Mich. 48088
Filed Aug. 21, 1967, Ser. No. 662,031
Int. Cl. B23q 3/10
U.S. Cl. 269—309          11 Claims

ABSTRACT OF THE DISCLOSURE

This disclosure relates to a spring loaded jack lock assembly or to a work supporting and locking device especially adapted for use with metal working machines. In finishing a casting or workpiece such workpiece is supported at fixed points. In addition adjustable intermediate supporting means, such, for example, as one or more movable plungers are provided for holding the medial portion of the workpiece against distortion, deflection and vibration.

---

The work supporting and locking device of the present invention comprises a body having a horizontal bore and a vertical bore which intersects the horizontal bore. A plunger having a work engaging position is reciprocally movable in the vertical bore, with the inner end portion of the plunger extending into the horizontal bore. The plunger is provided at opposite sides thereof with a pair of downwardly converging and inclined locking surfaces extending toward the inner end of the plunger. A pair of non-rotatable longitudinally aligned and movable locking sleeves or elements are located in the horizontal bore, with one sleeve located on each side of the inner end of the plunger. The adjacent or oppositely facing ends of the sleeves are also provided with inclined locking surfaces which are engageable with the corresponding inclined surfaces of the plunger. Each of the locking surfaces are inclined at the same angle of 6°. It has been found that such angle may be in the range of from 4°–7° inclusive for best results although in certain applications other angles may be used. An actuating rod extends through one sleeve and through the plunger into threaded engagement with the other sleeve. The operation of the actuating rod is effective to urge the corresponding inclined surfaces of the plunger and sleeves into locking engagement to fixedly locate the plunger in the work engaging or supporting position.

BACKGROUND OF THE INVENTION

Field of the invention

This invention is particularly adapted for use with metal working machines. In the machining of long workpieces or castings which are mounted at each end at fixed points it is desirable to provide adjustable intermediate supports between the ends to prevent distortion, deflection and vibration of the workpiece as it is being machined. The present invention is used for supporting castings or other bodies, particularly those having irregular shapes, while machining operations are being performed thereon.

Description of the prior art

Of the patents known to me the most pertinent are as follows: Brown, U.S. No. 1,125,807 of Jan. 19, 1915; Lyon, U.S. No. 1,438,250 of Dec. 12, 1922; Gardinier, U.S. No. 2,424,090 of July 15, 1947; and Sternbergh, U.S. No. 2,696,764 of Dec. 14, 1954. However, such patents do not disclose the novel arrangements of a pair of locking surfaces provided on the sides of the plunger and on the adjacent end surfaces of the locking sleeves as disclosed in the present invention.

SUMMARY OF THE INVENTION

In accordance with the present invention a spring loaded jack lock assembly is disclosed for supporting an irregular shaped body or casting upon which a machining operation is to be performed.

It is accordingly an object of the present invention to provide a simple and novel spring loaded jack lock assembly which will accurately and effectually support the casting or workpiece in the proper location for subsequent machining operations to be performed thereon.

Another object of the present invention is to provide a work support or spring loaded jack lock assembly which cannot be forced downwardly by any deflection or pressure on the workpiece.

Still another object of the present invention is to provide a spring loaded jack lock assembly having a work engaging plunger freely movable in a direction to contact a workpiece and means for locking the plunger in the work contacting position thereby rendering the plunger substantially immobile when forces are exerted upon it in an opposite direction by the workpiece.

A further object of the present invention is to provide a work supporting and locking device comprising a body having a pair of intersecting bores, a plunger having a work engaging position reciprocally movable in one of the bores and extending into the other of the bores, said plunger having at opposite sides thereof a pair of locking surfaces, locking means in the other bore comprising a pair of non-rotatable, axially movable sleeves or elements, such elements having on the adjacent ends thereof locking surfaces which are engageable with the opposite locking surfaces on the plunger, and actuating means connected to the locking means whereby operation of the actuating means is effective to urge the corresponding locking surfaces of the plunger and elements together to fixedly locate the plunger in the work engaging position.

It is thus another object of this invention to provide a simplified low cost structure of the aforementioned type having certain advantages contributing to efficiency, reliability, construction, operation and long life as well as ease of maintenance.

Further objects and advantages of the present invention will be apparent from the following description, reference being had to the accompanying drawings wherein a preferred form of the present invention is clearly shown.

DESCRIPTION OF A PREFERRED EMBODIMENT

Figure 1:
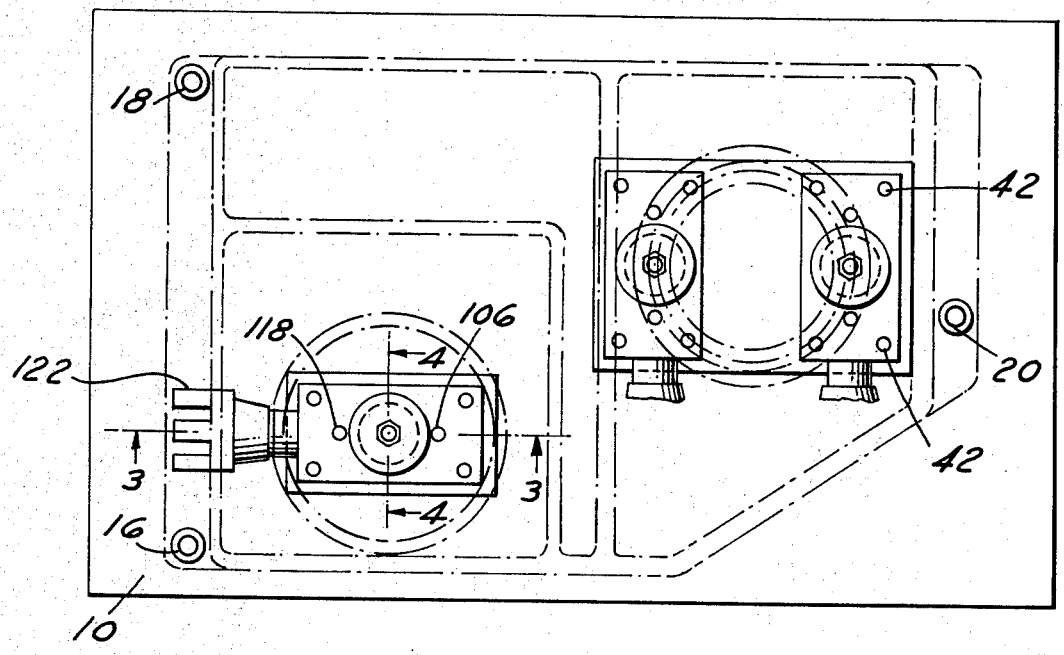
FIG. 1 is a plan view of a work table or fixture plate having fixed end supports and intermediate adjustable work supporting and locking devices thereon for supporting a casting or workpiece which is illustrated in dotted lines.
Figure 2:
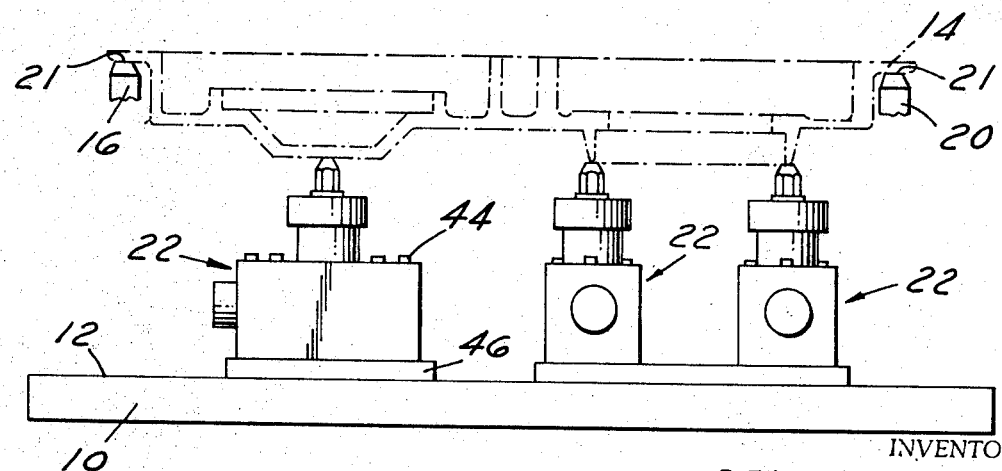
FIG. 2 is a front elevational view of the fixture plate and related equipment illustrated in FIG. 1, with the casting being illustrated in dotted lines.

A work support table or fixture plate 10 is illustrated in FIGS. 1 and 2 and is provided with an upper horizontal and flat surface 12. The casting or workpiece 14 to be machined is supported on the fixture plate 10 by means of three jacks or solid supports 16, 18 and 20, portions of which are illustrated in FIGS. 1 and 2 as is well known in the art. The top surfaces 21 of the jacks 16, 18 and 20 provide solid supports which are located in the same plane. Thus, when the casting 14 is mounted on the jacks 16, 18 and 20 the casting 14 is in the proper and required plane.

In order to prevent the workpiece 14 from deflecting it is necessary to support the medial portion of the workpiece 14. As an example, three spring loaded jacks or jack assemblies 22 may be used as illustrated in FIGS. 1 and 2. In addition the workpiece 14 may be bolted to a pair of threaded posts, not shown, as is well known in the art.

Each jack assembly 22 is of identical construction. The top surfaces of the plungers of the jack assemblies 22 engage the rough cast surfaces of the casting 14 to form a solid support after the plungers are locked in place. Thereafter when milling, boring or other machining operations are performed on the casting 14, the jacks 22 will prevent the medial portion of the casting 14 from deflecting. It should be appreciated that any number of assemblies 22 may be used depending on the size of the casting.

Figure 3:
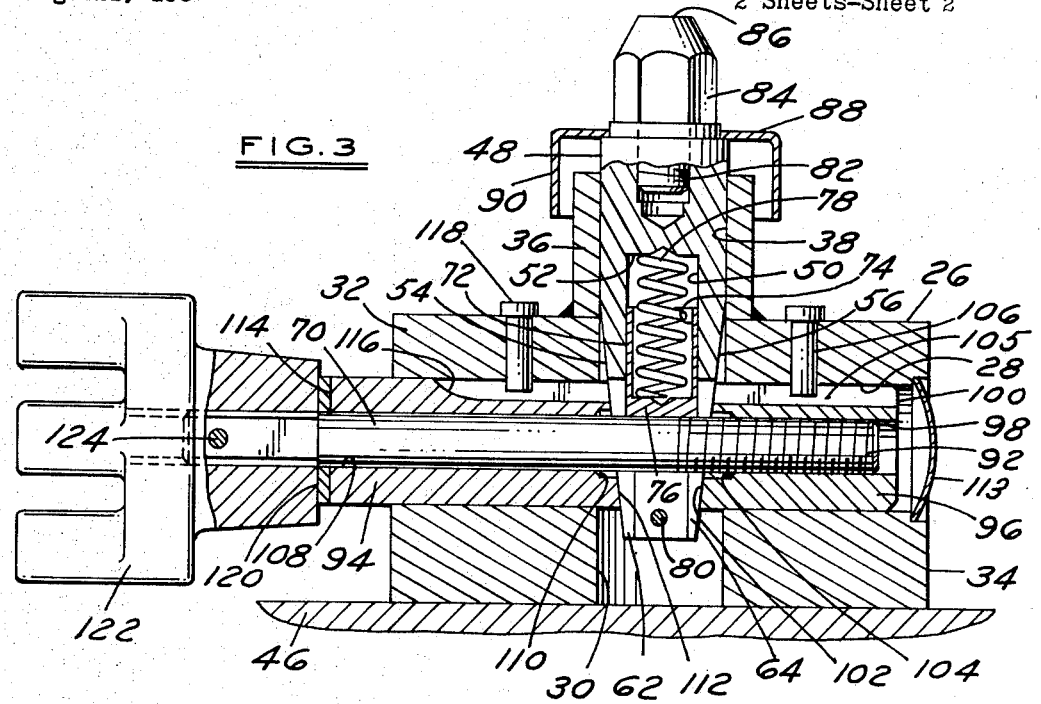
FIG. 3 is a sectional view through the novel work supporting and locking device taken substantially on the line 3—3 of FIG. 1.
Figure 4:
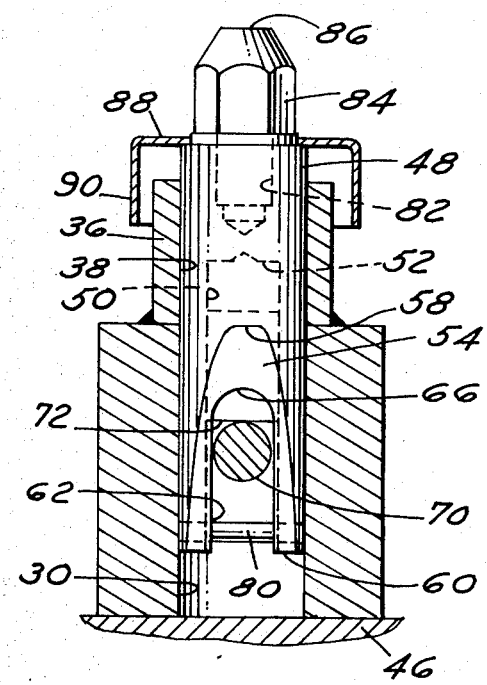
FIG. 4 is a sectional view through the novel work supporting and locking device taken on the line 4—4 of FIG. 1.

FIGS. 3 and 4 illustrate the specific features of the present invention. The work supporting and locking device or assembly 22 comprises a body 26 having a horizontal bore 28 and a vertical bore 30. The vertical bore 30 is located between the end surfaces 32 and 34. A bushing 36 is welded or otherwise secured to the top of the body 26 as is best illustrated in FIG. 3. The bushing 36 has a bore 38 which is axially aligned with the bore 30 in the body 26.

As shown in FIG. 1, the body 26 is provided at the four corners thereof with bolt holes 42 whereby bolts 44 (FIG. 2) are inserted through the holes 42 and the openings in the base or plate 46 and then into threaded engagement with the fixture plate 10 as is well known in the art.

The jack assembly 22 further includes a cylindrically shaped plunger 48 which is reciprocally movable in the vertical cylindrical bores 30 and 38. The outside surface of the plunger 48 is cylindrical throughout its length. The plunger 48 is provided with a recess, cavity or internal bore 50 having an inner end wall or surface 52 and extending through the inner end or surface 60 of the plunger 48 as best shown in FIG. 4.

Opposite outer surfaces of the plunger 48 are relieved or provided with relatively flat and inclined locking surfaces 54 and 56. The locking surfaces 54 and 56 converge towards the inner end of the plunger 48 as shown in FIG. 3. The locking surfaces 54 and 56 are inclined at the same approximately angle of 6°. It has been found that the locking angle may be in the range of 4°–7° inclusive for best results although in certain applications other angles may be used. Such surfaces are located on the exterior of plunger 48 starting at the place designated by the numeral 58 and terminating at the inner surface 60 as shown in FIGS. 3 and 4.

The locking surfaces 54 and 56 are provided with transverse openings 62 and 64 respectively, each opening starting at the place designated by the numeral 66 and terminating at the inner surface 60 as illustrated in FIGS. 3 and 4. Thus the openings 62 and 64 and the recess or bore 50 provide a passageway for the reception of an actuating rod 70 as will be explained hereinafter.

The plunger 48 further includes a cylindrical spring can or element 72 movable in the plunger bore 50. The can 72 is provided with an internal bore 74 which is closed on the inner end thereof. Located in the bore 74 is a biasing spring 78 having one end in contact with the inner end wall 76 and the other end in contact with the surface 52 of plunger 48. The can or element 72 is held in the plunger bore 50 by means of a transversely extending pin 80 located at the inner end portion of the plunger 48 as shown in FIG. 4. The can or element 72 is movable in bore 50 relative to the plunger 48 and is held in the bore 50 by means of the pin 80 and the surfaces of the plunger 48 defining bore 50.

The top end of plunger 48 is provided with a threaded recess 82 which receives the threaded end of the locator or locating button 84. The button 84 has a surface 86 which is engageable with the casting 14. The button 84 forms an extension of plunger 48. A downwardly turned dirt shield 88 is staked on the plunger 48 as shown in FIGS. 3 and 4 by any suitable fastening means. The shield 88 includes a collar 90 which surrounds the upper end of plunger 48 and the bushing 36. The shield 88 is movable with the plunger 48 and helps to prevent dirt or dust from entering the bore 38 via the upper end thereof.

The elongated actuating rod 70 is threaded on the inner end thereof at 92. Located in the bore 28 are a pair of longitudinally aligned and spaced apart locking sleeves or elements 94 and 96.

The inner sleeve 96 is provided with an internally threaded bore 98. The end surface 100 of sleeve 96 remote from plunger 48 is flat, while the end surface 102 adjacent the plunger 48 is inclined at a locking angle (as an example, 6°) corresponding to the locking angle on the locking surface 56 of plunger 48. The entrance to the bore 98 is provided with an annular recess 104. The top of the inner sleeve 96 is provided with an elongated slot or keyway 105 which extends the entire length thereof. A guide pin or locating element 106 carried by the body 26 extends into the keyway 105 to prevent the inner sleeve 96 from rotating in bore 28.

The outer sleeve 94 is provided with an internal non-threaded bore 108 having an annular recess 110 adjacent the inclined locking end surface 112. Such surface 112 is inclined at a locking angle (as an example, 6°) corresponding to the locking angle on the locking surface 54 of plunger 48. The other end surface 114 of sleeve 94 is flat. The top of sleeve 94 is provided with an elongated slot or keyway 116 which extends from the inclined end surface 112 to approximately the midpoint thereof. A guide pin or locating element 118 carried by the body 26 extends into the keyway 116 to prevent the outer sleeve 94 from rotating in bore 28.

The body 26 is provided with an expansion plug or closing element 113 which is received in the bore 28 to close same as shown in FIG. 3. The outer end of rod 70 is provided with a washer 120 and a handle 122 which is connected by a pin 124 or other means to the rod 70. The pin 124 is provided to rotate the rod 70. The thread provided on the rod 70 takes the pull against the tail knob or handle 122.

When assembling the component parts of the device 22, the inner sleeve 96 is first inserted in bore 26, with the keyway 105 aligned with and inserted over the guide pins 118 and 106, and with the locking surface 102 the last surface to enter bore 28. After the sleeve 96 is dropped into bore 28, the guide pin 106 prevents the sleeve 96 from rotating. Next the plunger 48 is inserted in the vertical bores 38 and 30, and rotated to a position where one of the locking surfaces provided thereon is opposite the corresponding inclined surface 112 on sleeve 96.

The washer 120 and outer sleeve 94 are placed on the actuating rod 70, with washer 120 engaging handle 122 and surface 114 of sleeve 94 engaging the washer 120. The keyway 116 is aligned with the guide pin 118 and the rod 70 and sleeve 94 are then inserted in the bore 26. At such time and by proper manipulation of the various parts, the threaded end 92 of rod 70 is urged between the spring can or element 72 and the pin 80, with the outer sleeve 94 moving over the guide pin 118 as explained previously. Thereafter the rod 70 is threaded into the inner sleeve 96.

When the rod 70 is only partially threaded into sleeve 96, the plunger 48 is movable vertically. The spring 78 urges the plunger 48 upwardly at all times. In use the device 22 is located beneath the casting 14, with the surface 86 of the plunger button 84 in contact with the casting. Thereafter the handle 122 is manipulated to rotate rod 70 and thread same into sleeve 96. As a result thereof the locking sleeves 94 and 96 are urged toward each other, with the locking surfaces 112 and 102 thereon frictionally engaging the corresponding inclined locking surfaces on the plunger 48 to thereby locate the plunger 48 and hence surface 86 in the requisite position to support the casting 14 during a machining operation. The movement of the locking sleeves 94 and 96 toward each other during operation of rod 70 results in a pinching action by the sleeves on the plunger 48. With such a construction the plunger 48 can be located and locked in any position between the upper and lower limits thereof. As an example the plunger 48 may have a stroke of ½".

It should be appreciated that other types of handle and rod constructions may be utilized. In addition the use of the locating button 84 described heretofore is optional.

The drawings and the foregoing specification constitute a description of the improved Spring Loaded Jack Lock Assembly in such full, clear, concise and exact terms as to enable any person skilled in the art to practice the invention, the scope of which is indicated by the appended claims.

What I claim as my invention is:

1. A work supporting and locking device comprising a body having a pair of intersecting bores, a plunger having a work engaging position reciprocally movable in one of said bores and extending into the other of said bores, said plunger having at opposite sides thereof a pair of locking surfaces, locking means comprising a pair of slidably movable elements in said other bore, one element on each side of said plunger, said elements having on the adjacent ends thereof locking surfaces which are engageable with the opposite locking surfaces on said plunger, and actuating means having a single operating member and being connected to said elements and acting on said elements simultaneously for conjointly urging the locking surfaces of said elements toward each other against the corresponding locking surfaces of said plunger to thereby subject said plunger to a pinching action resulting in fixedly locating said plunger in said work engaging position.

2. A work supporting and locking device comprising a body having a pair of intersecting bores, a plunger having a work engaging position reciprocally movable in one of said bores and extending into the other of said bores, said plunger having at opposite sides thereof a pair of locking surfaces, locking means in said other bore, said locking means comprising a pair of non-rotatably longitudinally movable elements, said elements having on the adjacent ends thereof locking surfaces which are engageable with the opposite locking surfaces on said plunger, and actuating means connected to said locking means, the operation of said actuating means being effective to urge the corresponding locking surfaces of said plunger and elements together to fixedly locate said plunger in said work engaging position, said actuating means comprising an actuating rod extending through one of said elements and through an opening in said plunger into engagement with the other of said elements.

3. A work supporting and locking device comprising a body having a vertical bore and a horizontal bore which intersects said vertical bore, a plunger having work engaging and non-engaging positions reciprocably movable in said vertical bore and extending into said horizontal bore, said plunger having at opposite sides thereof a pair of converging and inclined surfaces extending through and away from said horizontal bore, a pair of longitudinally aligned locking elements in said horizontal bore, one element on each side of said plunger, said elements having on the adjacent ends thereof inclined surfaces which are engageable with the inclined surfaces on said plunger, and an actuating rod extending through one of said elements and through an opening in said plunger into engagement with the other of said elements, the operation of said rod being effective to urge the corresponding inclined surfaces of said plunger and elements together into locking engagement to fixedly locate said plunger in said work engaging position.

4. The work supporting and locking device defined in claim 3 wherein said plunger is provided with a cavity, and a resiliently biased cam element in said cavity engageable with said actuating rod.

5. The work supporting and locking device defined in claim 4 wherein a closing member is provided on the inner end of said plunger adjacent said opening to prevent said plunger from being removed from said actuating rod while said rod remains in said body.

6. The work supporting and locking device defined in claim 3 wherein means is interposed between said body and said elements for preventing said elements from rotating.

7. The work supporting and locking device defined in claim 6 wherein said last mentioned means comprises a pair of key-ways in the outer surface of said elements, and a pair of guide members carried by said body which are received in said key-ways.

8. The work supporting and locking device defined in claim 3 wherein a shield is connected to said plunger exteriorly of said body for helping to prevent dirt from entering said body through said vertical bore.

9. The work supporting and locking device defined in claim 3 wherein said rod and said other element are threaded, said elements being movable in said horizontal bore with respect to said plunger.

10. The work supporting and locking device defined in claim 3 wherein an operating handle is secured to said rod exteriorly of said body.

11. The work supporting and locking device defined in claim 3 wherein the end of said horizontal bore opposite said other element is provided with a plug for closing same in order to help prevent dirt from entering said horizontal bore.

References Cited

UNITED STATES PATENTS

| 1,254,044 | 1/1918 | Johnson | 269—316 X |
| 3,421,750 | 1/1969 | Tridgell | 269—310 X |
| Re. 23,732 | 11/1953 | Cleveland | 269—310 |
| 2,986,075 | 5/1961 | Ranney | 269—34 X |

ROBERT C. RIORDON, Primary Examiner

U.S. Cl. X.R.

269—296